United States Patent [19]
Huissoon

[11] Patent Number: 6,044,308
[45] Date of Patent: Mar. 28, 2000

[54] METHOD AND DEVICE FOR ROBOT TOOL FRAME CALIBRATION

[76] Inventor: Jan Paul Huissoon, 468 Lorindale St., Waterloo, Ontario, Canada, N2K 2P6

[21] Appl. No.: 08/874,318

[22] Filed: Jun. 13, 1997

[51] Int. Cl.$^7$ .............................. G06F 19/00; G05B 15/02
[52] U.S. Cl. .......................... 700/166; 700/254; 700/259
[58] Field of Search ........................... 356/375; 318/577; 901/9, 47, 16; 702/153; 700/59, 166, 193–195, 251, 254, 259

[56] References Cited

U.S. PATENT DOCUMENTS

| | | | |
|---|---|---|---|
| 4,146,924 | 3/1979 | Birk et al. | 364/513 |
| 4,639,878 | 1/1987 | Day et al. | 364/513 |
| 4,815,006 | 3/1989 | Andersson et al. | 395/89 |
| 4,831,549 | 5/1989 | Red et al. | 364/513 |
| 4,967,370 | 10/1990 | Stern et al. | 395/89 |
| 5,083,073 | 1/1992 | Kato | 318/577 |
| 5,177,563 | 1/1993 | Everett et al. | 356/375 |
| 5,297,238 | 3/1994 | Wang et al. | 395/94 |
| 5,329,469 | 7/1994 | Watanabe | 364/571.01 |
| 5,457,367 | 10/1995 | Thorne | 318/568.11 |
| 5,471,312 | 11/1995 | Watanabe et al. | 358/296 |
| 5,506,682 | 4/1996 | Pryor | 356/375 |

FOREIGN PATENT DOCUMENTS 19507227  7/1996  Germany .

OTHER PUBLICATIONS

Finding the Mounting Position of a Sensor by Solving a Homogeneous Transform Equation of the Form AX=XB by Y.C. Shiu and S. Abmad, School of Electrical Engineering, Purdue University, W. Lafayette, In 47907, Abstract Pg. 1666, CH2413–3/87/000/1666501.00 © 1987 IEEE.

Everett, Louis J. and Liang Eng Ong, "Solving the Generalized Sensor–Mount Registration Problem" from *DSC–Vol. 29, Appplications of Modeling and Identification to Improve Machine Performance ASME 1991*, pp. 7–14.

Chou, Jack C.K. and M. Kamel, "Quaternions Approach to Solve the Kinematic Equation of Rotation, $A_aA_x=A_xA_{b9}$ of a Sensor–Mounted Robotic Manipulator", 1988, pp. 656–662.

Park, Frank C. and Bryan J. Martin, "Robot Sensor Calibration: Solving AX=XB on the Euclidean Group", *IEEE Transactions on Robotics and Automation*, vol. 10, No. 5, Oct. 1994, pp. 717–721.

Shiu, Y.C. and S. Ahmad, "Finding the Mounting Position of a Sensor by Solving a Homogenous Transform Equation of the Form AX=XB", 1987, pp. 1666–1671.

(List continued on next page.)

*Primary Examiner*—William Grant
*Assistant Examiner*—Steven R. Garland
*Attorney, Agent, or Firm*—Lynn C. Schumacher; Hill & Schumacher

[57] ABSTRACT

The present invention provides a method for calibration of pose of a tool center point (TCP) of a robot controlled tool with respect to a tool sensor means in which the robot controlled tool is attached at an end-point of the robot. The method provides a reference fixture with at least four topographically defined features, the reference fixture having a preselected first pose with respect to a robot frame of reference. A TCP sensor is located in a preselected second pose with respect to the reference fixture for sensing position of the tool center point. The method includes positioning the tool sensor so that the reference fixture is in a field of view of the tool sensor and calculating a pose of the robot end point with respect to the robot frame of reference, calculating a pose of the reference fixture with respect to the tool sensor means from a sensed position of the four topographically defined features of the reference fixture, and calculating a position of the tool center point with respect to the reference fixture from a sensed position of the tool center point with respect to the TCP sensor means. The position of the tool center point is calculated with respect to the tool sensor means and the robot end-point.

23 Claims, 8 Drawing Sheets

OTHER PUBLICATIONS

Shiu et al., Calibration of Wrist–Mounted Robotic Sensors by Solving Homogeneous Transform Equations of the Form AX=XBm *IEEE Transactions on Robotics and Automation*, vol. 5, No. 1, Feb. 1, 1989, pp. 16–29.

Diognon et al., "Recognition and Localization of Solid Objects by a Monocular Vision System for Robotics Tasks", *IEEE/RSJ/GI International Conference on Intelligent Robots and Systems* . . . , Munich, Sep. 12–16, 1994, vol. 3, Sep. 12, 1994, pp. 2007–2014.

Chen et al., "Modeling and Calibration of a Structured Light Scanner for 3–D Robot Vision", *IEEE International Conference on Robotic and Automation*, Mar. 31–Apr. 3, 1997, Raleigh, NC, vol. 2, 1987, pp. 807–815.

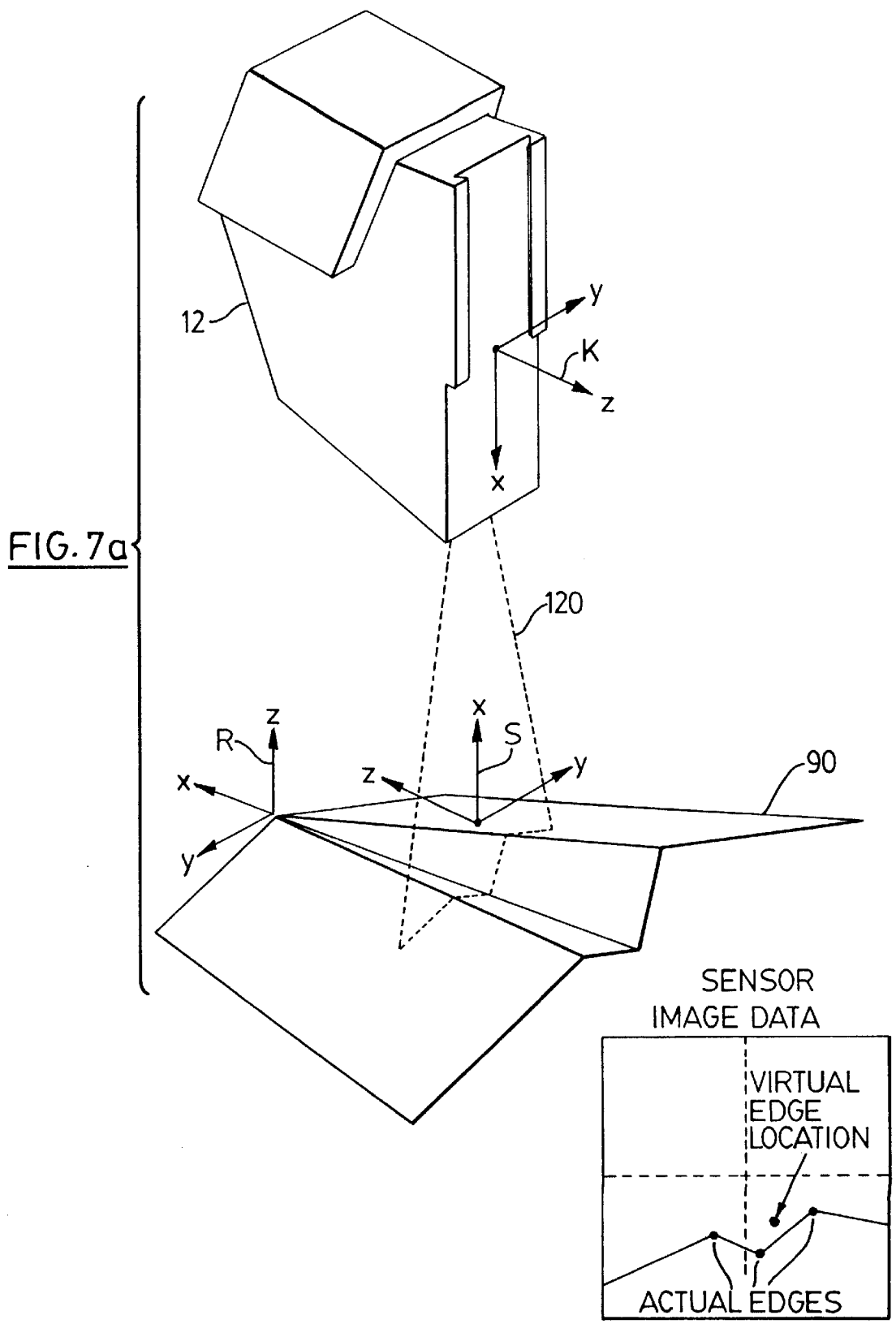

METHOD AND DEVICE FOR ROBOT TOOL FRAME CALIBRATION

FIELD OF THE INVENTION

The present invention relates to a method and system for robot tool frame calibration.

BACKGROUND OF THE INVENTION

The problem of determining the pose of a sensor with respect to the end-point (or tool flange) frame of a robot based on experimental measurements using the sensor, is generally referred to as the "sensor mount registration problem." This problem was first addressed in Y. C. Shiu & S. Ahmad, "Finding the Mounting Position Of A Sensor By Solving A Homogeneous Transform Equation of the Form AX=XB", Proc. 1987 IEEE Robotics & Automation Conf., pp. 1666–1671. A number of other publications have since been published on the topic which deal primarily with alternative mathematical approaches to the solution of the problem, see J. C. K. Chou & M. Kamel, "Quaternions Approach to Solve the Kinematic Equation of Rotation $A_aA_x=A_xA_b$ of a Sensor Mounted Robotic Manipulator", and F. C. Park & B. J. Martin, "Robot Sensor Calibration: Solving AX Equals XB On The Euclidean Group", IEEE Trans Robotics & Automation, Vol. 10 No. 5, 1994, pp717–721. However, the techniques disclosed by these references assume that the sensor is capable of measuring pose completely.

Everett et al. have proposed a more generalised technique, capable of solving the generalised sensor registration problem, as long as the sensor was capable of measuring at least one position variable and two independent components of the orientation variables, see L. J. Everett & L. E. Ong, "Solving The Generalised Sensor-Mount Registration Problem", Proc 1991 ASME Winter Annual Mtg., DSC V. 29. (ASME) pp7–14. Using a specialised calibration fixture attached to the tool flange, they showed that the tool transformation could be obtained using a rudimentary sensing procedure.

U.S. Pat. No. 5,457,367, entitled "Tool Center Point Calibration Apparatus And Method", discloses a method for calibrating the position of the tool center point (TCP) of a spot welding gun. The profile of each gun tip is measured by moving the tip back and forth across a light beam, and detecting when the light beam is broken. Once the center of the gun tip has been found, its position with respect to the robot end-of-arm face plate (or tool flange) is estimated, based on the specified and measured position of the light beam in the robot workspace. Two rotations with respect to this found position then enable the position of the gun tip with respect to the tool flange to be computed. This procedure is repeated for the second gun tip. This application is substantially different from the proposed method in that no end-of-arm sensor with which to correct the tool center point placement on-line is considered, and the technique itself requires a search procedure.

U.S. Pat. No. 5,297,238, entitled "Robot End-Effector Terminal Control Frame (TCF) Calibration Method And Device", discloses a method whereby a two dimensional calibration template is viewed by a camera mounted on the end-effector, from a near-normal orientation with respect to the calibration surface. The robot is moved parallel to the calibration surface to three different positions, and an image of the template is taken from each position. By analysing these three images, the X and Y translation components of the TCF, as well as the rotation about the TCF Z axis can be calculated. The TCF pose thus measured is incomplete, with the Z translation component unknown, and the prerequisite near-normal orientation with respect to the calibration surface effectively setting the pitch and yaw angles to zero (ie. not measured). This method can therefore not be used to measure the complete pose of the sensor with respect to the reference feature.

U.S. Pat. No. 5,329,469, entitled "Calibration Method For A Visual Sensor", discloses a method whereby a "dot pattern" on a fixture attached to the robot is viewed by one or more stationary cameras. Based on image analysis of the dot patterns for two robot positions, the position of the fixture with respect to the fixed camera reference frame is established. The objective is to calibrate the fixed camera with respect to the workspace of the robot, so that the camera may subsequently be used to determine the position of a workpiece that is to manipulated by the robot. This a very different application in that calibration of the robot itself is not considered. Indeed the technique is based on the presumption that the position (in robot workspace coordinates) of the fixture that the robot manipulates is exactly known.

U.S. Pat. No. 5,471,312, entitled "Automatic Calibration Method", discloses a method whereby a dot pattern (which may be three dimensional) is attached to the robot and viewed by up to eight stationary cameras, to obtain the spatial position of the dot pattern with respect to a fixed reference frame. The objective is to determine the relative transformation between the camera reference frame(s) and the robot work frame, so that subsequently, a workpiece position inaccuracy detected by the camera(s) may be converted into a robot correction. This technique also enables multiple robots to be calibrated with respect to the same reference frame, and is a logical extension of U.S. Pat. No. 5,329,469. However, this technique is not concerned with end-of-arm sensing or tool frame calibration, and requires a jig to be fitted to the robot.

SUMMARY OF THE INVENTION

The object of the present invention is to provide a reference fixture and a method whereby this fixture may be used for the calibration of a structured light sensor and welding laser with respect to the tool flange (or end frame) of an industrial robot.

The reference fixture or reference jig is designed to 1) enable the relative pose (ie. the position and orientation) of a structured light sensor and the relative position of the tool center point with respect to the robot tool flange to be checked using a single measurement, assuming the sensor and tool have been previously calibrated; 2) enable a measurement of the pose of the structured light sensor to be obtained with respect to the robot tool flange using three discrete measurements; and 3) allow the calibration procedure to be performed with the actual sensor and welding laser hardware in place on the tool flange, as opposed to having to use a specialised jig or fixture mounted on the tool flange for the calibration procedure.

The calibration procedure disclosed herein is significantly different to that addressed in the prior art in that it deals with a structured light seam tracking sensor that provides position and orientation data in the plane of the projected light source (ie. two dimensional data). An important feature of the sensor registration technique disclosed herein is that the combination of the design features of the calibration fixture in conjunction with the sensing capabilities of the sensor, together provide a means of determining the relative pose between the tool sensor frame and the robot tool flange frame, as well as the tool center point (TCP) with respect to both frames. While the method is very advantageous for laser welding applications where both sensor-to-tool-flange and laser-focal-point-to-tool-flange relationships must be precisely known, those skilled in the art will appreciate that the method disclosed herein it is also applicable to more conventional robot arc welding applications.

The present invention provides a method for calibration of pose of a tool center point (TCP) of a robot controlled tool with respect to a tool sensor means in which the robot controlled tool is attached at an end-point of the robot. The method comprises providing a reference fixture with at least four topographically defined features, the reference fixture having a preselected first pose with respect to a robot frame of reference. There is provided a TCP sensor means in a preselected second pose with respect to the reference fixture for sensing position of the tool center point. The method includes positioning the tool sensor means so that the reference fixture is in a field of view of the tool sensor means, calculating a pose of the robot end point with respect to the robot frame of reference, calculating a pose of the reference fixture with respect to the tool sensor means from a sensed position of the four topographically defined features of the reference fixture, and calculating a position of the tool center point with respect to the reference fixture from a sensed position of the tool center point with respect to the TCP sensor means. The position of the tool center point is calculated with respect to said tool sensor means and the robot end-point from the first and second poses and the other calculated poses and the calculated tool center point position.

In another aspect of the invention there is provided a method for calibration of position of a tool center point of a robot controlled tool with respect to a tool sensor means, the robot controlled tool being attached at an end-point of the robot. The method comprises providing at least one reference fixture comprising at least four topographically defined features, providing a second sensor means in a preselected pose with respect to the reference fixture for sensing position of the tool center point. The method includes positioning the tool sensor means in at least three viewing positions with respect to the at least one reference fixture and in each viewing position calculating a pose of the reference fixture with respect to the tool sensor means from sensed positions of the four topographically defined features of the reference fixture. The method includes calculating a position of the tool center point with respect to the reference fixture from a sensed position of said tool center point with respect to the second sensor means and calculating a pose of the tool sensor means with respect to the robot end-point by solving two matrix equations given by $$A_1 X = X B_1$$

$$A_2 X = X B_2$$

where X is the pose of the tool sensor means with respect to the robot end-point frame of reference, A is a transformation relating any two viewing positions, and B is a corresponding transformation relating the pose of the reference fixture with respect to the tool sensor means in said any two viewing positions.

The invention also provides a system for calibration of position of a tool center point of a robotically controlled tool attached at an end-point of a robot. The system comprises a first sensor means including means for projecting a beam of electromagnetic radiation and means for detecting a reflected image of the beam, positioning means for moving said first sensor means. A reference fixture attached to a support member and comprises at least four topographically defined features spatially distinguishable by the first sensor means within a field of view thereof. A second sensor means is attached to the support member in a preselected pose with respect to the reference fixture for sensing the position of the tool center. The system includes a processing means connected to the robot and the first and second sensor means for calculating from the reflected image a pose of the reference fixture with respect to the first sensor means and for calculating a position of the tool center point with respect to the first sensor means and the robot end-point.

BRIEF DESCRIPTION OF THE DRAWINGS

The method and devices for robotic tool frame calibration in accordance with the present invention will now be described, by way of example only, reference being had to the accompanying drawings, in which:

FIG. 6b is a view along arrow b of FIG. 6a;

FIG. 7a is a perspective view of a structured light sensor and a reference fixture with a virtual edge in accordance with the present invention;

FIG. 7b illustrates a plot of sensor image data for the sensor configuration of FIG. 7a in accordance with the present invention;

DETAILED DESCRIPTION OF THE INVENTION

In the field of robotically controlled tools, it is technically difficult to locate (or measure the location of) a calibration jig with respect to the robot base frame to the level of accuracy required in some applications. For example, this is especially significant in applications such as laser welding wherein the required positional accuracy is on the order of ±0.1 mm. This also effectively precludes the detachment or re-attachment of the sensor and welding laser mount during or after the calibration procedure. However, if an accurate tool sensor to robot end-point relationship (or transformation) has been previously established, and the measured location of the calibration jig from a reference robot end-point or wrist position is known from a previous measurement, returning the robot wrist to the reference position and taking a single measurement will enable any error in the tool sensor pose with respect to the robot wrist to be calculated, if complete calibration jig pose with respect to the tool sensor can be measured. This is based on the assumption that the robot wrist can be accurately returned to the reference position. However, this is a well recognised characteristic of robot manipulators; the repeatability with which the end-point (or wrist) can be returned to a pretaught position is typically 0.004" (0.1 mm), if the motion to this position is along a consistent trajectory.

The present method is predicated on the concept that the combination of the calibration fixture design with the sensing capabilities of the sensor, can together provide a means of determining the relative relationship or pose between the sensor frame and the robot tool flange frame, as well as the tool center point with respect to both frames. The technique is most advantageously used for laser welding applications, where both sensor-to-tool-flange and laser-focal-point-to-tool-flange relationships must be precisely known. However, it will be appreciated by those skilled in the art that the method is equally applicable to more conventional robot arc welding applications.

Figures 1, 2:
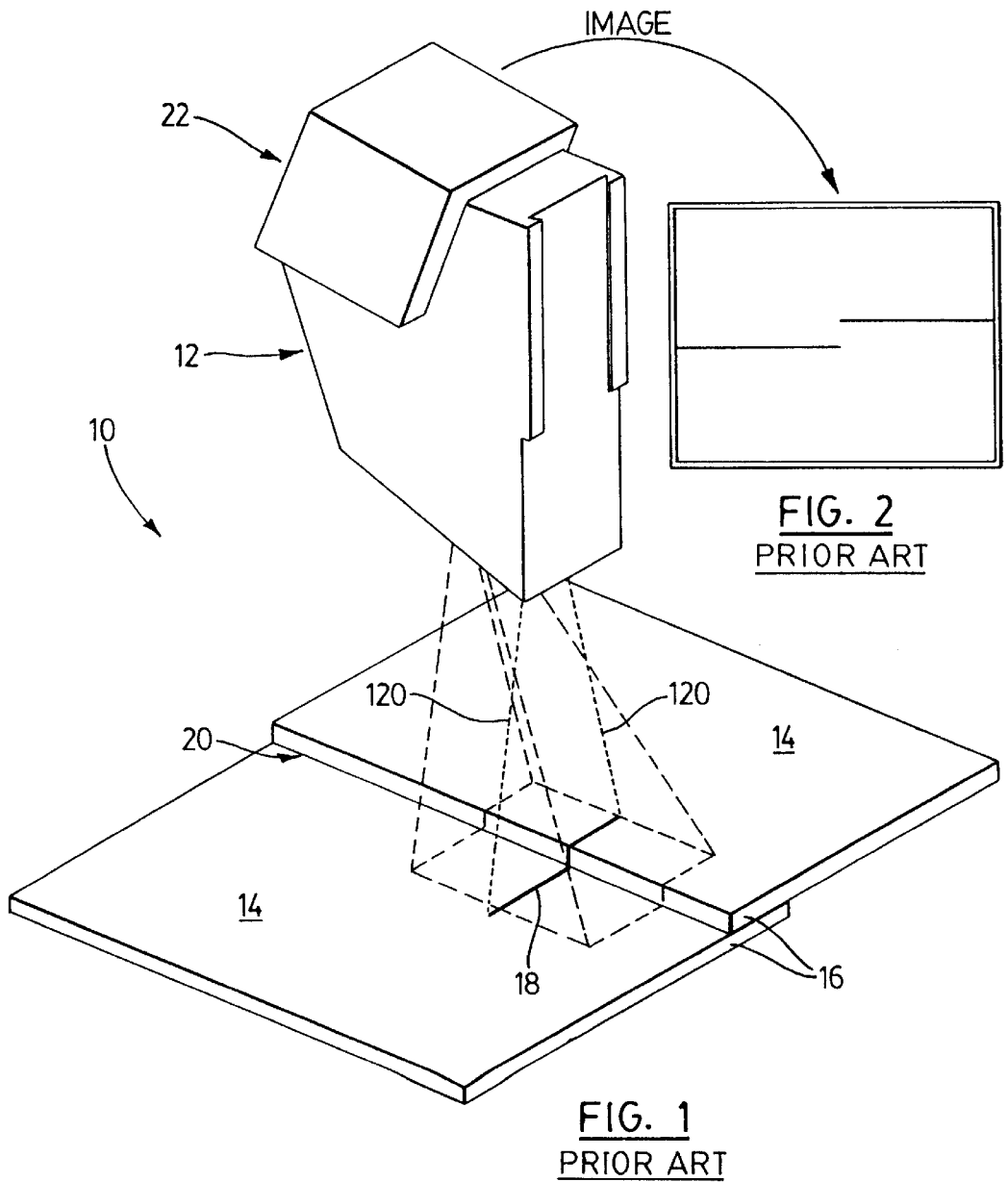
FIG. 1 illustrates the operating principle of a prior art structured light sensor in a seam tracking application.
FIG. 2 illustrates the image of the lap joint acquired by the sensor in FIG. 1.

Referring to FIG. 1, there is shown generally at 10 a prior art structured light sensor 12 sensing a seam 20 of a workpiece 16 being welded. Structured light sensor 12 includes a coherent light source such as a laser and a camera both contained in a housing 22. Sensor 12 operates on the principle of passing light from the source through appropriate optics to produce a beam 120 of light which is projected onto the surface 14 of workpiece 16 to produce a light strip 18, and analysing the image of the reflected light viewed at an angle to the projected light plane using the camera. While many variations on the structured light projection form exist (eg. multiple parallel light planes, conic light sources), the single light plane form is considered herein for purposes of illustration only. It will be understood by those skilled in the art that the same principles are applicable to the other forms of structured light projection and the method of present invention may be used in combination with any of these other forms.

The image acquired by sensor 12 from the projection of the single light stripe 18 on a target surface (representing a lap joint) is depicted in FIG. 2. It is evident that location of the joint or seam 20 (FIG. 1) can be determined in the image, as well as the slope of the adjacent surfaces. However, there are theoretically an infinite number of positions in which the sensor could be positioned with respect to this joint which would all result in the same sensor image. For example, a rotation about the surface normal at the joint, or a translation of the sensor along the joint, will result in the same sensor image. It is therefore not generally possible to obtain complete relative pose information (i.e. the six components x, y, z, roll, pitch, yaw) of the sensor with respect to an arbitrary object or surface using this type of sensor.

Figure 3:
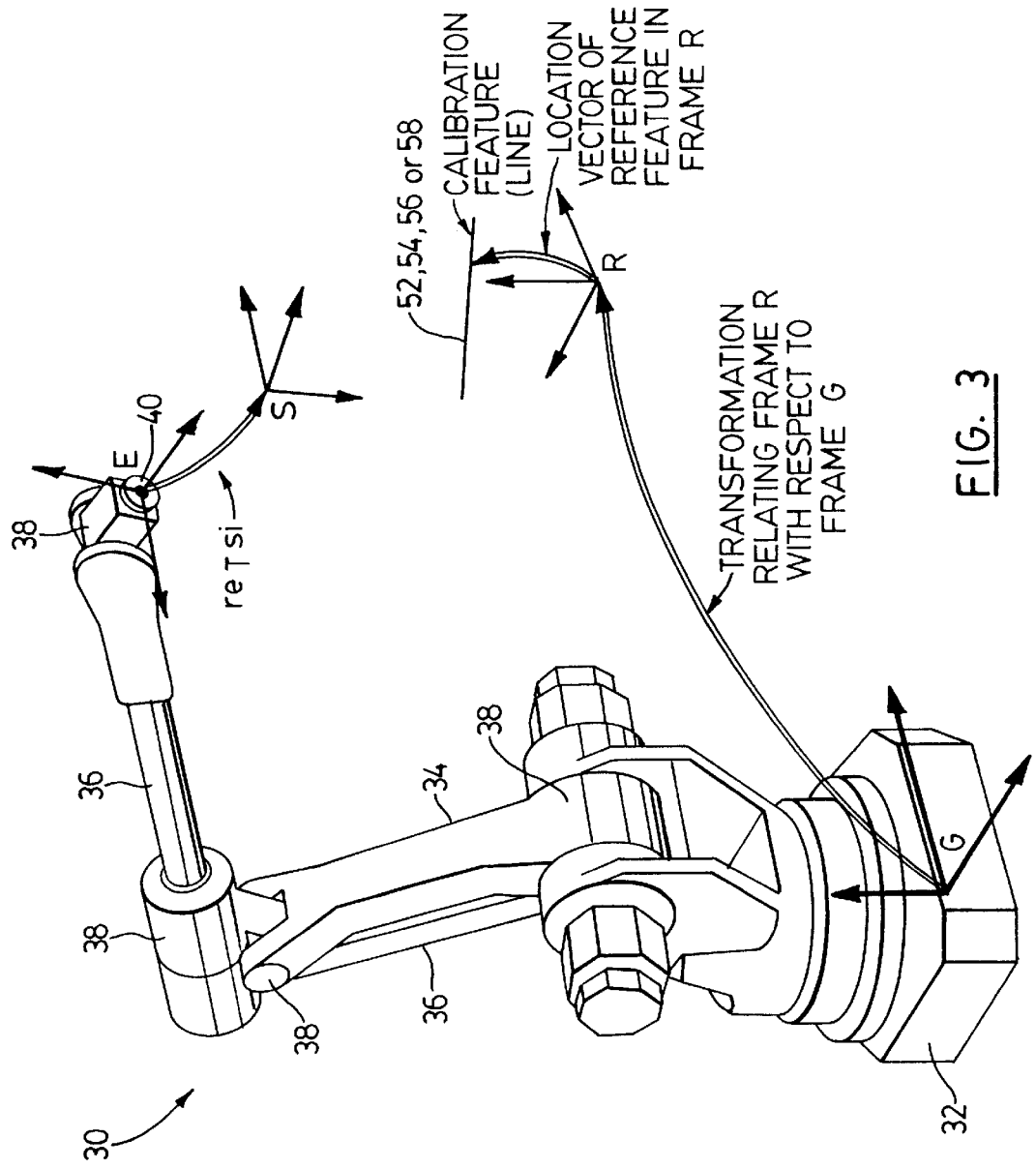
FIG. 3 is a perspective view of a robot using a robotic tool frame calibration method in accordance with the present invention.

The tool center and tool sensor calibration problem being addressed by the present invention is depicted in FIG. 3. A robot at 30 comprises a base 32 and a manipulator 34 provided with several linkages 36 connected to joints 38 with an end effector or end-point 40. A tool (not shown) having a tool center point (TCP) is attached to end-point 40 of robot 30 and is robotically controlled by the robot. The pose of coordinate frame E of the robot end-point 40 with respect to a global coordinate reference frame G of robot 30 is defined by the forward kinematic model of the robot so that given the angles of joints 38 and the lengths of links 36 and the robot geometry, the pose of frame E can be uniquely computed with respect to frame G. The pose of the reference coordinate frame R of a calibration feature 44 is assumed constant and known with respect to frame G. Reference frame S is the coordinate frame for sensor image frame, and it is the pose of frame S with respect to frame E which is to be found based on sensor measurements of calibration topographically defined features 52, 54, 56 or 58 of a reference fixture 44 (FIG. 4) which are known in the reference frame R. That is, given the relative pose of the end-point frame E with respect to the reference frame R, determine the pose of the sensor frame S with respect to the end-point frame E using sensor measurements of a known fixture 44 in the reference frame R.

Figure 4:
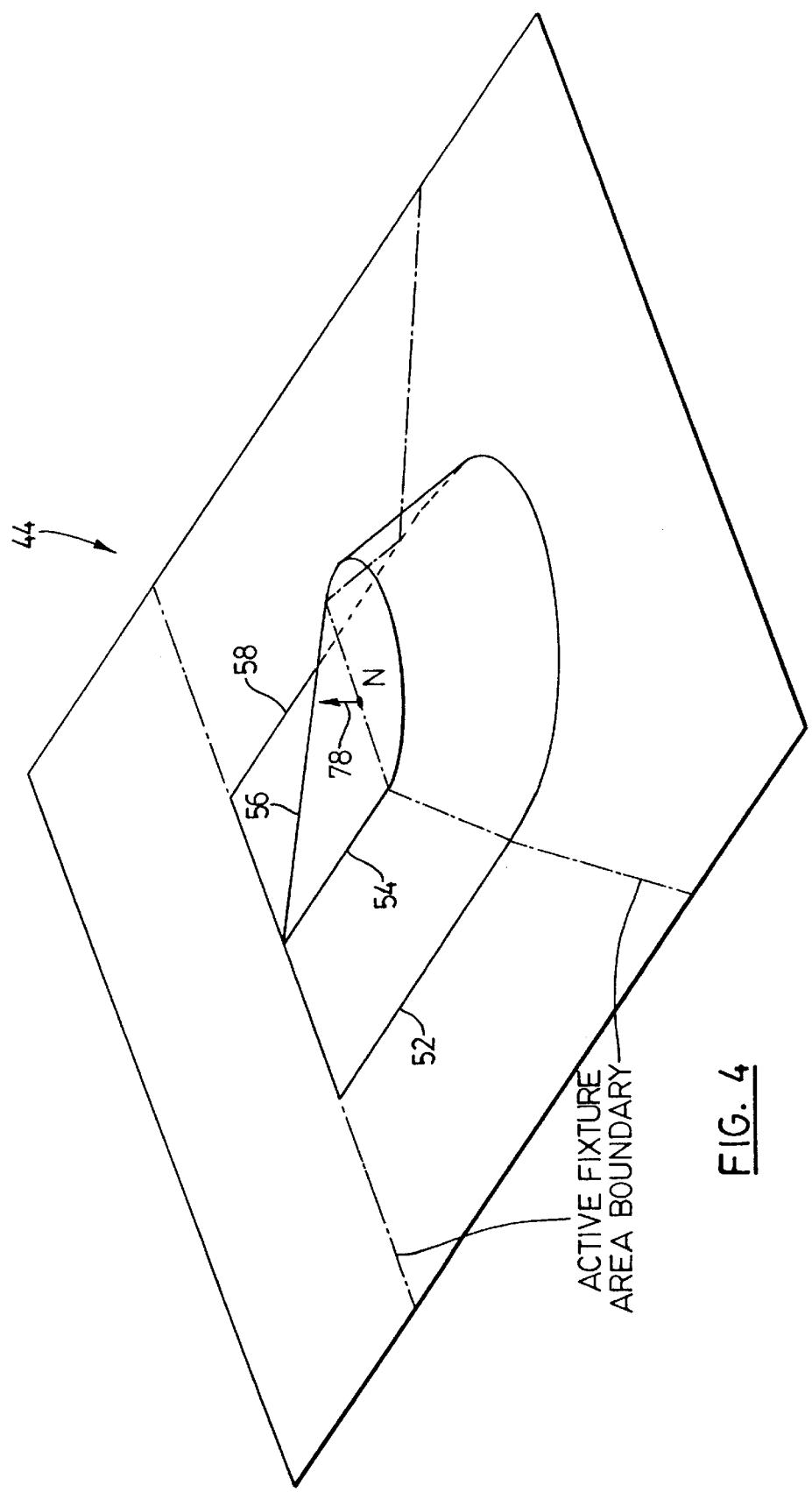
FIG. 4 is a perspective view of a calibration fixture constructed according to the invention.

Referring to FIG. 4, reference fixture 44 constructed in accordance with the present invention exhibits the above-mentioned four uniquely distinguishable topographical features when viewed by structured line sensor (within the useful range of the fixture). Specifically, in the reference fixture 44 shown in FIG. 4, these features are the intersection lines 52, 54, 56 and 58 of the surfaces of the 3-D reference fixture, and these intersection lines define the reference fixture features. The intersection lines cannot be arbitrarily chosen, although there is no unique configuration of these lines that provides the reference fixture with the necessary properties. In the case where the topographical features are linear edges, no three of the edges can be parallel to each other. In FIG. 4 the active fixture area is enclosed by the broken lines.

Figure 5A:
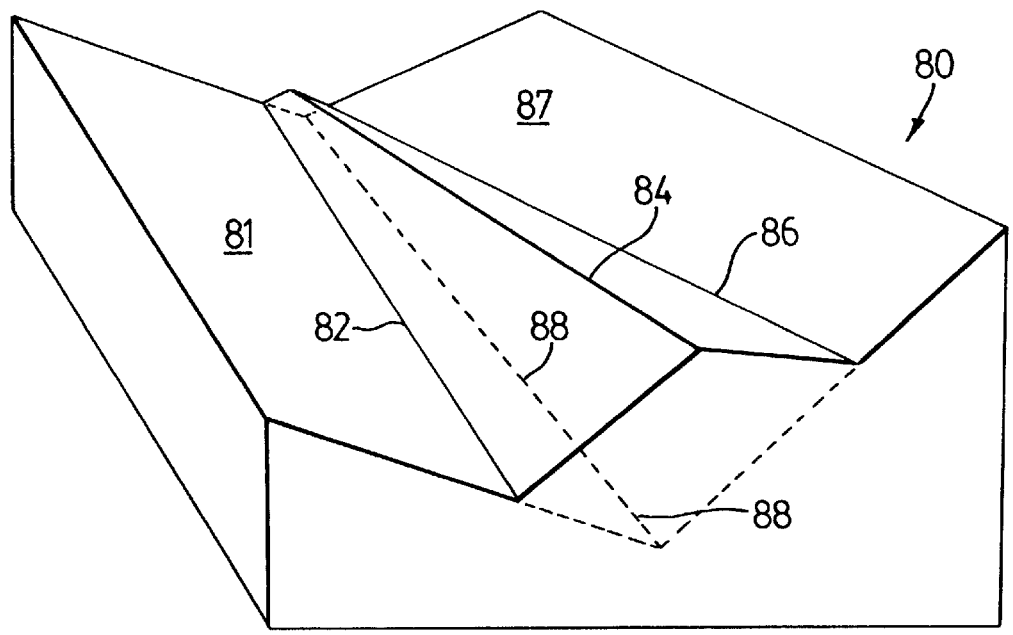
FIG. 5a is a perspective view of a calibration fixture having three topographical edges and a virtual edge.

Referring to FIG. 5a, another reference fixture 80 constructed in accordance with the present invention exhibits three uniquely distinguishable topographical features 82, 84 and 86 when viewed by a structured line sensor, and a fourth topographically defined virtual feature 88 which may be constructed from the sensor data by computer generating the virtual edge from an intersection of two differently inclined surfaces of the reference fixture. In the embodiment of the reference fixture 80 shown in FIG. 5a, the topological features 82, 84 and 86 are the intersection lines of the different surfaces of the 3-dimensional reference fixture, as well as the virtual edge 88 contained within the fixture (shown by the broken line) at the intersection of the extrapolated surfaces 81 and 87.

Figure 5B:
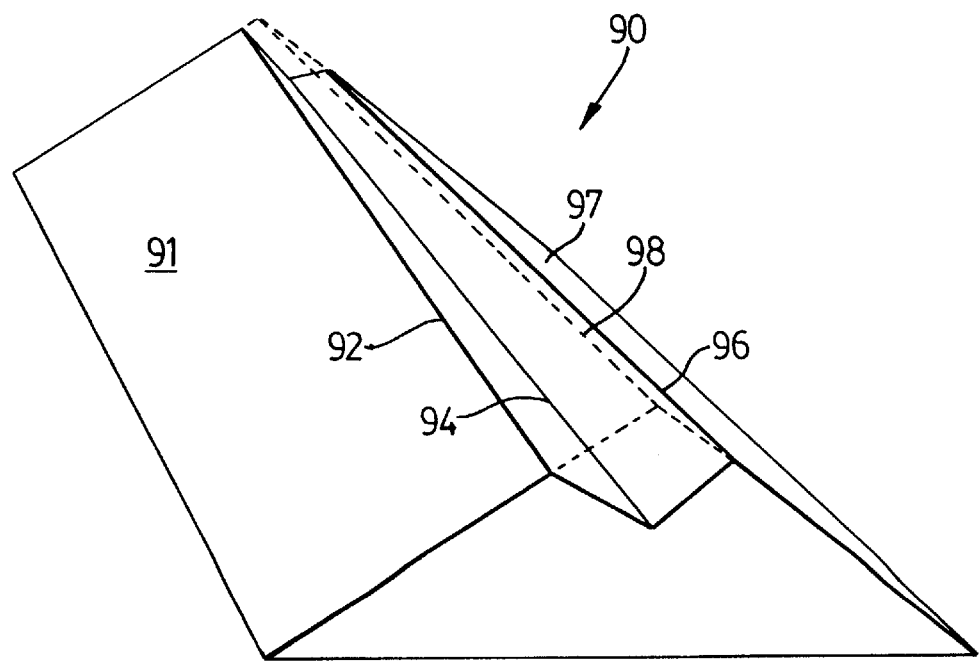
FIG. 5b is a perspective view of an alternative embodiment of a calibration fixture having three topographical edges and a virtual edge.

FIG. 5b illustrates another embodiment of a reference fixture 90 which is provided with three uniquely distinguishable topographical features 92, 94 and 96 defined by the intersection of the different surfaces of the 3-D object and a fourth virtual edge 98 (shown by the broken line) located outside of the object calculated at the intersection of extrapolated surfaces 91 and 97.

Figure 6A:
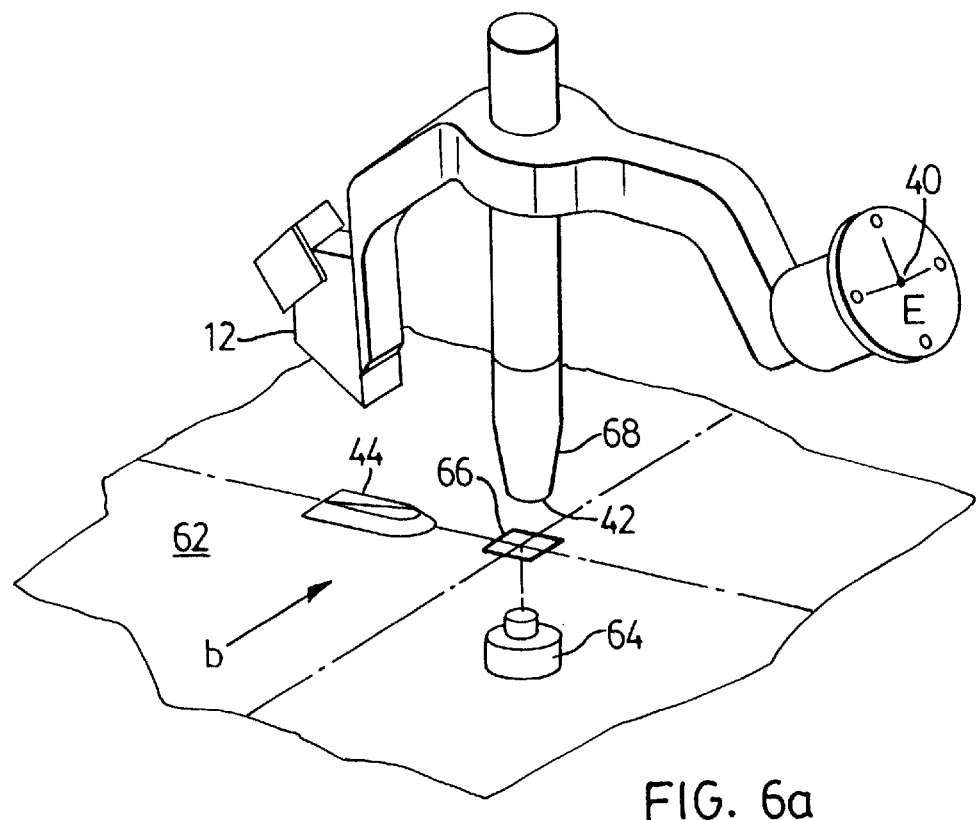
FIG. 6a is a perspective view of a portion of a calibration jig constructed in accordance with the present invention.
Figure 6B:
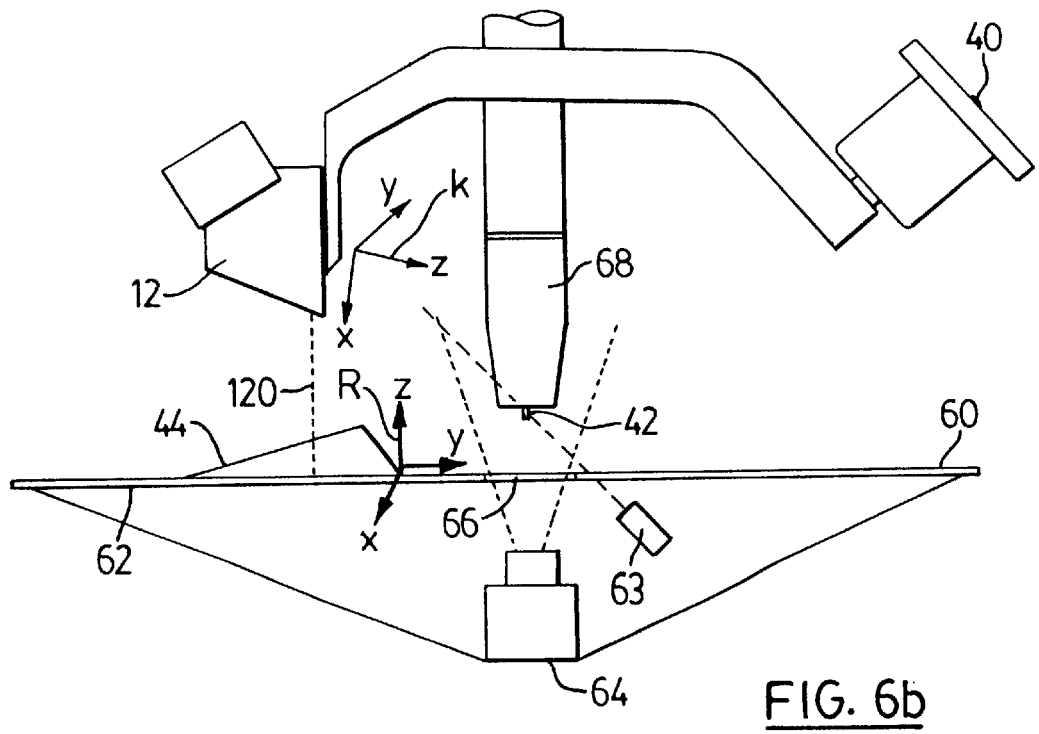

Referring to FIGS. 6a and 6b, the reference fixture 44 is mounted on a calibration jig 60 comprising a support table 62 and one or more active area sensor(s) 64 are attached to the support in known positions or poses with respect the reference fixture 44. Referring to FIG. 6b, the sensor(s) 64 are located below viewing window(s) 66 located in table 62. Active area sensor 64 is preferably an optical sensor such as a CCD array or video camera in the case where the robotically controlled tool 68 is, for example, an arc welding torch as shown or a laser for welding (not shown). The function of laser grid generator 63 is to illuminate the edges of the gas cup and the tip of the electrode or contact tube so that analysis of area sensor 64 image data can establish the location of tool center point (TCP) 42 with respect to reference fixture 44. In the case of a laser welding application, the TCP is the focal point of the welding laser and its position may be determined by analysing the image of the focussing laser spot on a projection screen 66 shown in FIG. 6. Since the TCP sensor is in a known position with respect to the structured light sensor calibration features, the TCP position with respect to the sensor can thus be computed.

The data obtained from the reflected light signal received by the camera of structured light sensor 12 describes the surface features in the field of view of the light sensor. To achieve sub-pixel resolution in such sensor measurements, the intersections of segmented data regions may be used. Least squares lines or curves may be fitted to the data representing the various surfaces, and the intersection points of these lines or curves used to give a better estimate of the actual intersection point than the individual pixels can resolve. This enables the location, in sensor coordinates, of the intersection of the surfaces of fixture 44 in the field of view of sensor 12 to be quite accurately computed. Given that the intersection points in the sensor data can be accurately found, the design of reference fixture 44 enables the spatial transformation that relates the position of the reference fixture frame of reference R with respect to the sensor frame of reference K (FIG. 6b) be uniquely determined using the methodology of the following mathematical development.

The problem to be addressed is depicted in FIGS. 7a and 7b. FIG. 7a shows a structured light sensor 12 projecting a plane of light 120 onto reference fixture 90 as shown in FIG. 5b. The sensor image data represents the surface profile (or section) of the reference fixture where the light plane 120 strikes (or effectively intersects) the surface of the reference fixture. The sensor image frame is defined with respect to the projected light plane, so that the position of detectable reference surface features in the plane of the projected light can be expressed in sensor image frame coordinates. Note that the sensor image frame S is fixed with respect to the sensor 12 itself, and the sensor image frame coordinates can therefore readily be transformed to sensor frame coordinates K. The reference fixture topography is known, the reference surface features being defined with respect to the reference fixture coordinate frame. The requirement is to define the relative pose (ie. the six components X, Y, Z, roll, pitch, yaw) of the sensor frame with respect to the reference fixture coordinate frame.

The structured planar light sensor can only detect the profile of the surface of the reference fixture in the plane of the projected light. If the surface of the reference fixture consists of intersecting (locally) planar surfaces, a topographically defined feature is the intersection line (or curve) of two of these surfaces in 3-space. It will be understood that an intersection line does not have to physically exist for it to be considered an identifiable feature; for example, in FIGS. 5a and 5b, the virtual intersection lines 88 and 98 respectively may be computed from sensor data, although in the fixture 80 of FIG. 5a it lies within the solid reference fixture, while in the fixture 90 of FIG. 5b it lies in space above the reference fixture.

The parametric representation of a line with respect to a frame R in 3-space can be written as P+t n, where P is a vector $[P_x, P_y, P_z]^T$ from the origin of R to a point on the line, n is a unit vector $[n_x, n_y, n_z]^T$ along the line, and t is a scalar. The sensor image frame pose with respect to the reference fixture frame is given by the homogeneous transformation $^R T^S$:

$$^R T^S = \begin{bmatrix} a_{11} & a_{12} & a_{13} & a_{14} \\ a_{21} & a_{22} & a_{23} & a_{24} \\ a_{31} & a_{32} & a_{33} & a_{34} \\ 0 & 0 & 0 & 1 \end{bmatrix}$$

which can be written more compactly as:

$$^R T^S = \begin{bmatrix} R_m & T_m \\ 0 & 1 \end{bmatrix}$$

where $R_m$ is the rotation submatrix:

$$R_m = \begin{bmatrix} a_{11} & a_{12} & a_{13} \\ a_{21} & a_{22} & a_{23} \\ a_{31} & a_{32} & a_{33} \end{bmatrix}$$

and $T_m$ is the translation vector:

$$T_m = [a_{14} a_{24} a_{34}]^T$$

The vector $T_m$ defines the location of the sensor image frame origin in reference fixture frame coordinates. In the rotation submatrix $R_m$, $a_{i1}$ (i=1,2,3) represent the components of a unit vector along the X axis of the sensor image frame expressed in reference fixture frame coordinates; $a_2$ and $a_3$ likewise represent unit vectors along the sensor image frame Y and Z axes respectively. Of the 9 components of the rotation submatrix defining the sensor image frame pose with respect to the reference feature frame, only 3 are independent. Since $a_1$, $a_2$ and $a_3$ are each of unit length, only two terms in each are independent. Furthermore, since the three unit vectors $a_1$, $a_2$ and $a_3$ are orthonormal (ie. form the three axes of a unit frame), given two of these vectors, the third may be computed. Thus the rotation submatrix can be computed if two components of one of the unit vectors and one component of either of the other two unit vectors are known; however, the solution is not unique. For example, assuming $a_{11}$, $a_{21}$ and $a_{12}$ are known, then, since $a_{11}^2 + a_{21}^2 + a_{31}^2 = 1$, then $$a_{31} = \pm \sqrt{1 - a_{11}^2 - a_{21}^2},$$

and since $a_{11}a_{12}+a_{21}a_{22}+a_{31}a_{32}=0$, then $a_{22}=k_1 a_{32}+k_2$ where $k_1=-a_{31}/a_{21}$, $k_2=-a_{11}a_{12}/a_{21}$, so that two values for $a_{22}$ exist, corresponding to $\pm a_{31}$.

Furthermore, $a_{12}^2+a_{22}^2+a_{32}^2=1$, so that $a_{32}^2(k_1^2+1)+a_{32}(2k_1 k_2)+(a_{12}^2+k_2^2-1)=0$, yields two solutions for $a_{32}$, for each pair of solutions ($a_{22}$, $a_{31}$). Thus, four alternative solutions for the triplet ($a_{31}$, $a_{32}$, $a_{22}$) are obtained.

Now if the plane in which the sensor projects its structured light is defined as the U-V plane, and this is taken to coincide with the X-Y plane of the sensor image reference frame, a point [u,v] in the projected light plane corresponds to the point $[u,v,0,1]^T$ in the sensor image frame which can be expressed in reference fixture frame coordinates as:

$$\begin{bmatrix} a_{11} & a_{12} & a_{13} & a_{14} \\ a_{21} & a_{22} & a_{23} & a_{24} \\ a_{31} & a_{32} & a_{33} & a_{34} \\ 0 & 0 & 0 & 1 \end{bmatrix} \begin{bmatrix} u \\ v \\ 0 \\ 1 \end{bmatrix} = \begin{array}{l} a_{14} + u a_{11} + v a_{12} \quad (i) \\ a_{24} + u a_{21} + v a_{22} \quad (j) \\ a_{34} + u a_{31} + v a_{32} \quad (k) \end{array}$$

These three expressions in i, j, k, (the unit vectors in the reference fixture frame) can be equated to the respective components of the line feature in the reference fixture frame, yielding the three equations:

$$a_{14}+ua_{11}+va_{12}=P_x+tn_x \quad (i)$$

$$a_{24}+ua_{21}+va_{22}=P_y+tn_y \quad (j)$$

$$a_{34}+ua_{31}+va_{32}=P_z+tn_z \quad (k)$$

The values of u and v in these equations represent the coordinates (in the sensor U-V plane) of the intersection of the line (or edge) feature with the sensor light plane. These values would be obtained by analysing the sensor image data to determine the location (possibly with sub-pixel resolution) of the edge, and converting this to sensor image frame coordinates. The nine $a_{ij}$ values are unknown (although not entirely independent), as is the value of t (the distance along the edge from the point P at the light plane intersection with the edge). Thus if the reference fixture provides a single edge that can be detected by the sensor, we have the above 3 edge equations and the 3 unit vector equations which together contain 10 unknowns.

If the reference fixture provides two edges, only one additional unknown is introduced: the value of t for the second edge. We then have nine equations with 11 unknowns. Likewise, if the reference fixture provides three edges, we have twelve equations in twelve unknowns. The equation set for the three edge problem is then:

$$a_{14} + u_k a_{11} + v_k a_{12} = P_{xk} + t_k n_{xk}$$
$$a_{24} + u_k a_{21} + v_k a_{22} = P_{yk} + t_k n_{yk} \quad \text{Edge } k, 1 \le k \le 3$$
$$a_{34} + u_k a_{31} + v_k a_{32} = P_{zk} + t_k n_{zk}$$

$$a_{11}^2 + a_{21}^2 + a_{31}^2 = 1$$
$$a_{12}^2 + a_{22}^2 + a_{32}^2 = 1 \quad \text{Unit orthogonal vectors}$$
$$a_{11}a_{12} + a_{21}a_{22} + a_{31}a_{32} = 0$$

In this set of 12 equations, the 12 unknowns are the nine $a_{ij}$, and $t_1$, $t_2$ and $t_3$. However, these equations are not all linear, and it has already been shown that the three unit orthogonal vector equations produce four solutions if three of the six $a_{ij}$ are known. It is therefore not possible to obtain a general single solution to this problem using only three edges. If four reference fixture edges are available, the problem can be formulated so that a linear solution can be used, with the extra constraints used to identify the correct solution. The three general edge equations for each of the four edges are then:

$$a_{14} + u_k a_{11} + v_k a_{12} = p_{Xk} + t_k n_{Xk}$$
$$a_{24} + u_k a_{21} + v_k a_{22} = p_{Yk} + t_k n_{Yk} \quad \text{Edge } k, 1 \le k \le 4$$
$$a_{34} + u_k a_{31} + v_k a_{32} = p_{Zk} + t_k n_{Zk}$$

The $t_k$ term in each set of edge equations may be eliminated, reducing the problem to 8 (linear) equations in 9 unknowns (the $a_{ij}$). Since the $u_k$ and $v_k$ coefficients are the coordinates of edge k obtained from the sensor data, and the $p_{Xk}$, $p_{Yk}$, $p_{Zk}$, $n_{Xk}$, $n_{Yk}$, and $n_{Zk}$ terms are the known parameters defining edge k, the system of equations may be written as $$Ax=b$$

where A is a (known measured) 8×9 matrix of the orientation vector components for each edge and the sensed edge locations, x is a 9×1 vector of the $a_{ij}$ values to be found, and b is a (known) 8×1 vector of parameters defining the edges. By adding a ninth row of zeros to the A matrix, and a ninth zero element to the vector b, the problem may be solved using the Singular Value Decomposition (SVD) technique, which will result in a solution of the form:

$$e_l = x_l + fV_{k,l} \quad 1 \le l \le 9$$

where each $e_l$ corresponds to one of the $a_{ij}$, f is a constant, and $V_k$ is a column of 9 values (corresponding to the zero row appended to A) returned by the SVD algorithm, together with the minimum length solution vector x.

The two unit vector equations and the orthogonality requirement may then be used to determine a least squares best value for the factor f, thus yielding a least squares solution vector $e_l$ from which the complete estimated transformation $^R T^S$ can be computed. The transformation defining the pose of the reference fixture frame with respect to the sensor image frame, $^S T^R$, is then simply the inverse of $^R T^S$.

Thus if the spatial pose of the reference fixture 44 is known, and the spatial pose of the robot wrist or end-point frame of reference is known, the relative pose of sensor 12 with respect to the end-point frame may be computed.

The design of reference object 44, which, when viewed by single line structured light sensor 12, provides complete pose information of the relative location of the reference object with respect to the sensor reference frame. Also, the reference object is so designed that the validity of the sensor data may be immediately established. It will be understood by those skilled in the art that other sensor systems may be used in place of the single line structured light sensor. For example, a single beam sensor wherein the single beam is scanned from side to side is essentially equivalent to the single projected line structured light sensor in terms of the surface profile data that is generated. If the sensor employs two structured light planes, the four required features may be obtained using a calibration fixture with two topographical edge features.

The method described above for calibration of tool center point and tool sensor using a single reference fixture 44 was predicated upon knowledge of the pose of fixture 44 with respect to the robot reference frame G (which is preset) and the pose of the robot end frame 40, reference frame E, see FIG. 3, which is calculated during the calibration procedure by the robot processor using the forward kinematic model.

Figure 8A:
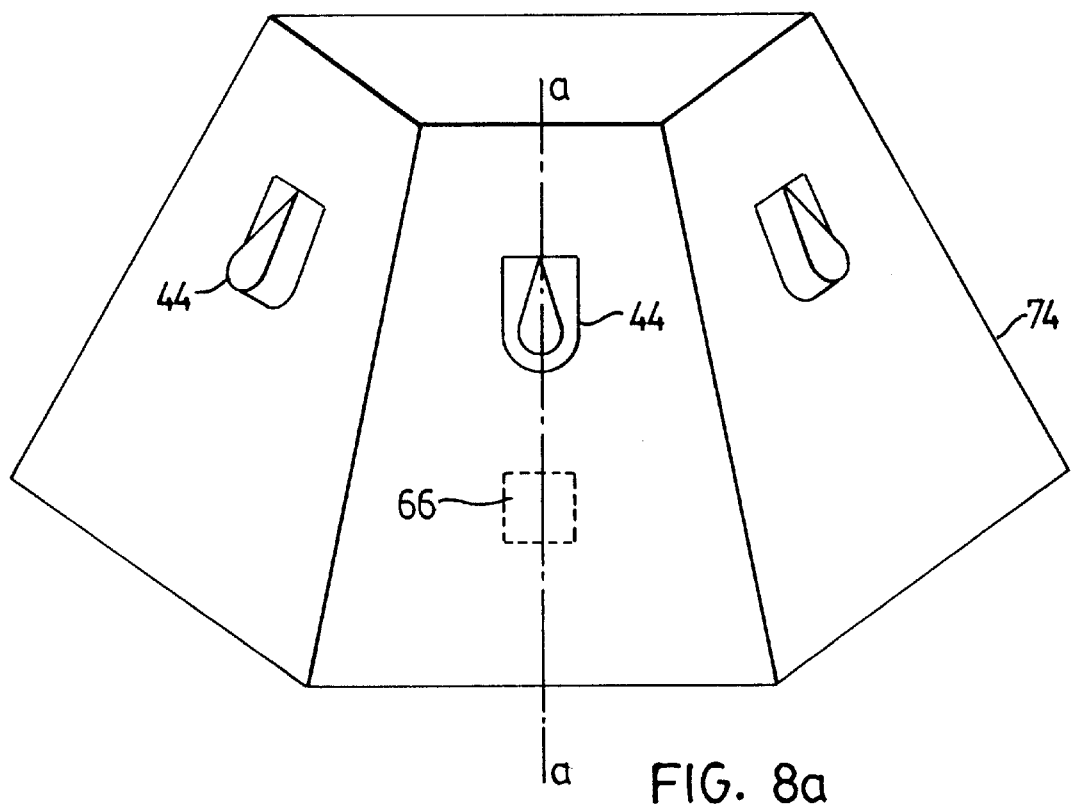
FIG. 8a is a perspective view of a calibration jig containing three calibration features similar to the calibration feature shown in FIG. 4 used in an alternative calibration procedure also forming part of the present invention.

An alternative method using reference fixtures according to the invention can be used which utilizes sensing of a reference fixture by the tool sensor (such as single line structured light sensor 12) from three separate viewpoints which are related by specific motions of the robot wrist frame. Alternatively, single measurements of three separate reference fixtures positioned in known poses with respect to each other will provide the same information. This enables the sensor-to-wrist frame or end-point transformation to be uniquely established, regardless of the position of the calibration jig in the workspace of the robot so that the reference fixtures do not need to be in a preselected pose with respect to the robot frame of reference and the pose of the end-point with respect to the robot frame of reference is not required. FIG. 8a illustrates a calibration jig using three reference features located in a preselected orientation with respect to each other.

For optimal resolution of the components of the tool sensor-to-robot wrist transformation, the reference fixture must provide adequate relative measurement accuracy. The reference motion should be such that when the calibration jig is viewed by the sensor at either end of the reference motion, the (inevitable) measurement error (or accuracy)

minimises the error in the computation of the sensor-to-wrist transformation. This requires specific calibration jig design features as well as specific robot motions.

The reference surfaces on calibration fixture 44 shown in FIG. 4 are oriented with respect to one another so that the reference feature (meaning the solid shape enclosed by the reference surfaces) may be viewed over a range of rotations about all tool sensor 12 frame axes of about ±20° from the central surface normal N, assuming that the reference feature remains within the field of view of the sensor. This angular viewing range is limited by the need to be able to observe all four reference feature edges 52, 54, 56 and 58. If an edge becomes occluded with respect to tool sensor 12 (FIG. 1) by one of the reference surfaces, the ability to uniquely determine the pose of the sensor with respect to the reference feature is lost. However, the design of reference feature 44 is such that this condition can be readily detected, and an automatic search for a better viewing angle performed. Moreover, the design of the calibration jig is such that if the reference feature is partially or completely out of the field of view of the sensor, then at most two edges can be detected in the sensor image. This ensures that severe out-of-position measurements cannot accidentally provide the four edges that the calibration procedure relies upon, or the three edges that would indicate an approximately correct position but for which the viewing angle(s) must be adjusted.

If the reference feature is approached along a central surface normal N, then two additional measurements at about ±15° to this (as long as the rotation axes to obtain these views are not parallel or anti-parallel, and preferable not close to these conditions) will be sufficient to uniquely determine the sensor-to-robot wrist transformation. A single reference feature would thus suffice to calibrate the system. However, as stated above, it is also possible to position three such reference features on a suitably designed base structure, so that the three measurements required for calibration are taken on the three separate reference features, each precisely located with respect to one another. FIG. 8*a* illustrates a design for such a calibration jig structure which conforms to the "edge observability" constraints described above. Three calibration features 44 are shown mounted on a support frame 74 in preselected positions so the relative pose of each feature with respect to each of the other features is accurately known. Preprogrammed tool-frame motions would be used to move tool sensor 12 over each of the three reference features.

Details of the mathematical processing methodology which has been adapted by the inventor to extract the relative poses of the end-point and tool sensor are disclosed in Y. C. Shiu & S. Ahmad, "Finding the Mounting Position of a Sensor by Solving a Homogeneous Transform Equation of the Form AX=XB", Proc. 1987 IEEE Robotics & Automation Conf., pp. 1666–1671 and are summarized herebelow.

Figure 9:
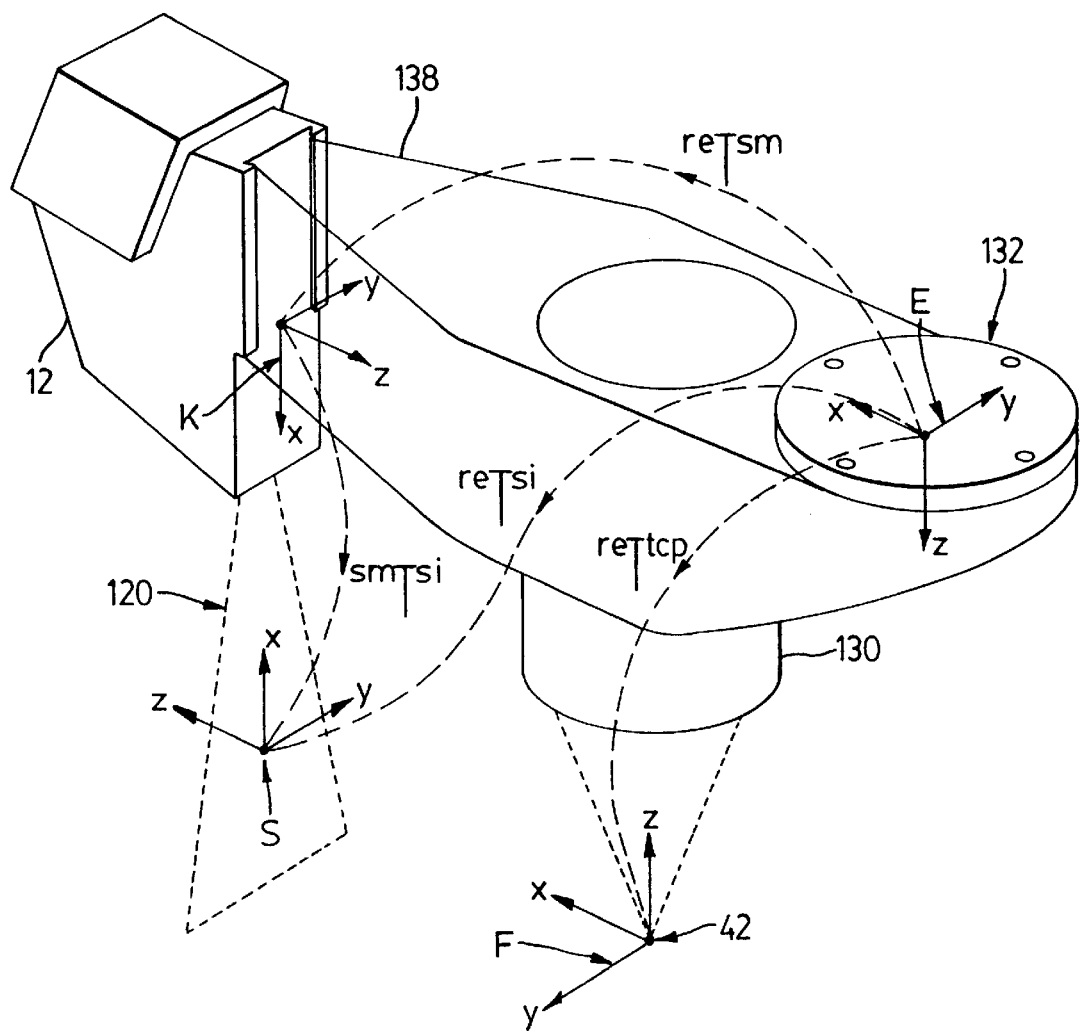
FIG. 9 is a perspective view of a sensor, welding laser, fixture and tool flange, and the coordinate frames associated with each.

FIG. 9 shows a laser profiling sensor 12 and a welding laser delivery head 130 attached to the tool flange 132 of a robot by means of a fixture 138. In this application the tool center point 42 is the laser focal point. Four coordinate frames are associated with this configuration: 1) the robot end frame E, 2) the tool frame F, 3) the sensor mount frame K, and 4) the sensor image frame S. The robot end frame E pose is known with respect to the robot base coordinate frame G (FIG. 3) via the forward kinematics of the robot, and which may include a constant transformation that locates this frame on the tool flange of the robot. The tool frame F origin, usually referred to as the tool center point (or TCP), corresponds to the focal point of the welding laser as stated above. The fixture defines the transformation $^{re}T^{sm}$ between the robot end frame E and the sensor mount frame K, as well as the transformation $^{re}T^{tcp}$ between the robot end frame E and the tool frame F. Both of these transformations can be measured or obtained from the design drawings used to manufacture the fixture, although neither are assumed to be exactly known.

The transformation $^{sm}T^{si}$ (which is constant) relates the sensor mount frame K to the sensor image frame S, and is defined by the sensor design. This is usually obtained by calibrating the sensor 12, since the sensor image frame S origin is a virtual point in space with respect to the sensor mount frame K. If the sensor is to be used to correct the position of the TCP 42 during robot motions, the pose of the sensor image frame S with respect to the robot end frame E must be known, as must the position of the TCP 42 with respect to the sensor image frame S. Two approaches may be used to determine the pose of the sensor image frame S with respect to the robot end frame E.

The first approach relies on combining the measured fixture transformation $^{re}T^{sm}$ with the calibrated sensor mount frame K to sensor image frame S transformation $^{sm}T^{si}$ to produce the robot end frame E to sensor image frame S transformation $^{re}T^{si}$. This approach has the advantage that the sensor image frame S to robot end frame E can be determined off-line, but is entirely dependent on the accuracy of the transformations. Should the sensor mount pose with respect to the robot end frame E be altered (for example, by an accidental collision), the robot must be shut down and the sensor and fixture removed and recalibrated before proper operation can commence. However, it is also important that any such accidental alteration of the sensor image frame S to robot end frame E be detected; otherwise the sensor based tool correction strategy will result in consistently defective TCP positioning.

The second approach is to experimentally calibrate the pose of the sensor image frame S with respect to the robot end frame E on-line; this directly establishes the transformation $^{re}T^{si}$. If the sensor is capable of measuring the complete relative pose of a reference fixture (ie. the position and orientation of the reference fixture with respect to the sensor image frame S), then if the reference fixture location with respect to the robot base frame G is precisely known, a single measurement enables $^{re}T^{si}$ to be calculated since the pose of the robot end frame E with respect to the robot base is known from the forward kinematics. If the reference fixture location with respect to the robot base frame G is not precisely known, then three measurements of the relative pose of the reference fixture taken from three distinctly different perspectives (the necessary relationships between which will be defined) enable $^{re}T^{si}$ to be calculated. The most significant advantage of being able to measure the complete pose of the reference feature with a single measurement is that once the system is calibrated (ie. $^{re}T^{si}$ has been found), $^{re}T^{si}$ may subsequently be verified or recomputed with a single measurement.

The proposed reference fixture characteristics enable a laser profiling sensor to determine the complete pose the reference fixture with respect to the sensor image frame S in a single measurement. However, it would generally be very difficult to define the position of the reference fixture with respect to the robot base frame G to the accuracy demanded in laser welding applications. Furthermore, it is well recognised that the pose of the robot end frame E with respect to the robot base frame G may also not be precisely known, even though this is based on the forward kinematics of the robot. The "signature" of the robot is used to address this inaccuracy, although we will assume that this is not available, or at least not to the accuracy demanded. However, it can be reasonably assumed that small relative motions of the robot end frame E can be accurately defined, even if the absolute robot end position with respect to the base frame G is subject to error. The inventor has adapted the technique proposed by Shiu & Ahmad to address this problem directly. In their paper, it was shown that the relative pose between the sensor frame S and the robot end frame E could be uniquely determined from the relative poses between three robot positions from which images of a fixed reference fixture were obtained. The only qualifications on the relative motions were proven to be that these should comprise rotations, and that the effective rotation axes be neither parallel nor anti-parallel.

The requirement for two motions (and three images), and the subsequent solution to the problem can be explained as follows. A reference feature is located at a fixed but unknown position with respect to the robot base. If an image of the reference feature is taken from an initial position $P_1$, and the robot end frame E is rotated about some axis in space to a position $P_2$ from which a second image of the reference feature is taken, the information available is the transformation relating positions $P_1$ and $P_2$, and the change in pose of the reference feature between the corresponding images. This information enables two of the three rotations to be expressed in terms of the third rotation, and two of the three translations to be expressed in terms of the third translation. In other words, the solution has 2 degrees of freedom and is therefore not unique. It is necessary to obtain a third image from another view point to solve the problem uniquely. Using three such measurements, Chou & Kamel provide an elegant solution for determining the rotation sub-matrix of the transformation relating the sensor image frame to the robot end frame E (an alternative approach is also provided by Shiu & Ahmad). Having solved the rotation sub-matrix, the translation components can be computed uniquely in accordance with the present invention.

This procedure can be summarised as follows:

1) From position $P_1$, obtain an image of the reference fixture, and compute the pose of the reference fixture with respect to the sensor image frame S, $^S T^R_2$.
2) Move the robot to a second position $P_2$ (by rotating about some arbitrary axis $k_1$), obtain a second image of the reference fixture and compute the pose of the reference fixture with respect to the sensor image frame S, $^S T^R_2$.
3) Move the robot to a third position $P_3$ (by rotating about some other arbitrary axis $k_2$, which must not be parallel nor anti-parallel to $k_1$), obtain a third image of the reference fixture and compute the pose of the reference fixture with respect to the sensor image frame S, $^S T^R_3$.
4) Compute the transformation, $A_{12}$, that defines the change in pose of the robot end frame E between the first and second positions $(P_1, P_2)$, and the transformation $B_{12}$ that defines the change in pose of the sensor image frame S between the first and second positions as $B_{12} = {^S T^R_1} \cdot {^S T^R_2}^{-1}$.
5) Likewise, compute the transformation, $A_{13}$, that defines the change in pose of the robot end frame E between the first and third positions $(P_1, P_3)$, and the transformation $B_{13}$ that defines the change in pose of the sensor image frame S between the first and third positions as $B_{13} = {^S T^R_1} \cdot {^S T^R_3}^{-1}$. Note that transformations $A_{23}$ and $B_{23}$ could also be used, and are computable from $A_{12}$, $A_{13}$, and $B_{12}$, $B_{13}$ as defined above.
6) Compute the axes of rotation $k_1$ and $k_2$, and the rotations $\theta_1$ and $\theta_2$ about these axes.
7) From the rotational submatrices $Ra_{12}$, $Ra_{13}$, $Rb_{12}$ and $Rb_{13}$ (of $A_{12}$, $A_{13}$, $B_{12}$ and $B_{13}$ respectively), and using either the technique described in Shiu & Ahmad or that in Chow & Kamel, compute the rotation submatrix Rx of the robot end frame to sensor image frame transformation.
8) Using the result of step 7 together with the position vectors $Pa_{12}$, $Pa_{13}$, $Pb_{12}$ and $Pb_{13}$ (of $A_{12}$, $A_{13}$, $B_{12}$ and $B_{13}$ respectively), compute the position Px of the sensor image frame S origin with respect to the robot end frame E by solving the matrix equation:

$$Px = (E^T E)^{-1} E^T F$$

where $E = \begin{bmatrix} Ra_{12} - I \\ Ra_{13} - I \end{bmatrix}$ and $F = \begin{bmatrix} RxPb_{12} - Pa_{12} \\ RxPb_{13} - Pa_{13} \end{bmatrix}$ 9) Combine the orientation matrix Rx and position vector Px from steps 7) and 8) to obtain the required transformation $^{re}T^{si}$ defining the pose of the sensor image frame S with respect to the robot end frame E.

Once the pose of the sensor image frame with respect to the robot end frame E has been found, the position of the tool center point with respect to the sensor image frame S (or the robot end frame E) must be determined. In laser welding applications, a focusing laser is usually provided so that the focal point of the delivery head optics may be determined. The low power focusing laser may be projected onto a flat surface (such as a sheet of paper), and the distance of the delivery head from the surface adjusted so that projected spot is brought into focus. The focal distance of the welding laser is specified with respect to that of the focussing laser. The diameter of the projected laser spot at the focal distance is typically 0.6 mm, the center of which must typically be positioned to within ±0.1 mm when welding.

Figure 8B:
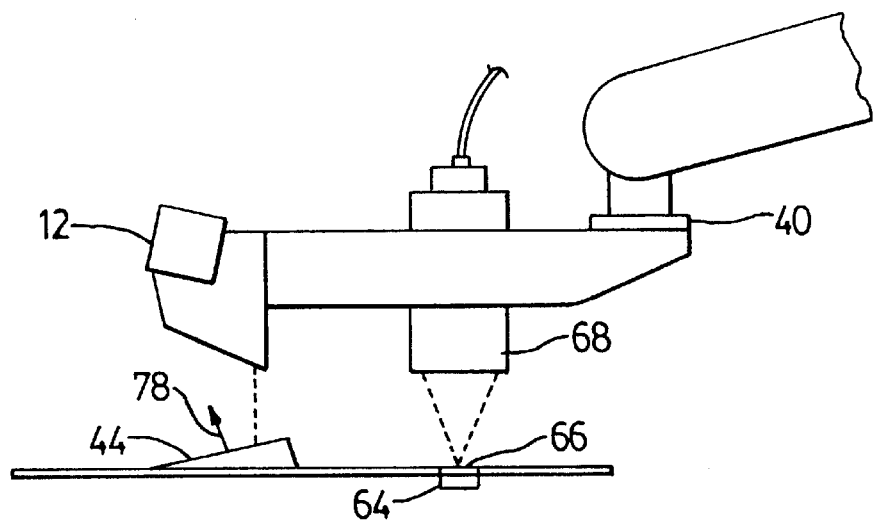
FIG. 8b is a view along the line a—a of FIG. 8a of the calibration jig with a tool sensor and robotically controlled tool in position during the calibration procedure.

Referring to FIG. 8b, to automatically determine the position of the focal point with respect to the sensor image frame S, an area sensor 64 (such as a CCD array) is located on the calibration fixture in a precisely known position with respect to the reference features that are used by the profiling sensor to determine $^{re}T^{si}$. The robot is taught a position so that the projected laser spot is approximately centered on the area sensor and slightly below the estimated focal distance, with the axis of the welding laser approximately normal to the surface of the area sensor, and with the reference features visible in the profiling sensor image. Since the calibration fixture is fixed in the robot workspace, this position need only be taught once.

An image of the projected laser spot is analysed to determine its diameter and the position of its center on the area sensor. The relative position of the reference fixture with respect to the profiling sensor image frame is also computed. The robot then moves a short predefined distance (typically 2 mm) away from the reference fixture, along the normal to the area sensor. This move is made in tool frame coordinates, where the tool transformation is set to $^{re}T^{si}$.

A second image of the laser spot is analysed to determine its new position and diameter, and the relative position of the reference fixture with respect to the profiling sensor image frame S is also computed. The robot then moves back by the same predefined distance again, and a third image of the laser spot is analysed to determine its position and diameter, together with the relative position of the reference fixture with respect to the profiling sensor image frame S. Based on these three images and the measured motions between them, the distance at which the projected laser spot diameter will be a minimum (ie. the focal distance) can be calculated (given the focused spot diameter), as can the focal point position on the area sensor, the welding laser axis, and the corresponding position of the reference fixture with respect to the profiling sensor. This then enables the tool center point position (ie. the welding laser focal point) to be calculated with respect to the sensor image frame S, thus completing the calibration procedure. On subsequent calibration checks, it is simply necessary to measure the diameter and position of the projected laser spot together with the location of the reference fixture as measured by the profiling sensor, to verify that the sensor image frame S, tool frame F and robot end frame E are still properly aligned.

If an arc welding torch is used instead of a welding laser, the tool center point is defined with respect to the electrode or contact tube, depending on the welding process being used. The area sensor used in the laser welding fixture can then be replaced by a structured light sensor or by two video cameras, possibly with backlighting to simplify image analysis. These sensors would again be located precisely on the calibration fixture with respect to the reference features used to determine $^{re}T^{si}$. Since the electrode position can be physically measured (as opposed to the virtual tool center point in the case of a welding laser), once the robot has moved to its taught position with respect to the reference fixture, a single set of measurements would be sufficient to determine the TCP location with respect to the sensor image frame.

I claim:

1. A method for calibration of pose of a tool center point (TCP) of a robot controlled tool with respect to a tool sensor means, the robot controlled tool being attached at an end-point of said robot, and the tool sensor means being affixed to the end-point of the robot and spaced from the robot controlled tool, comprising:
   a) providing a reference fixture with at least four topographically defined features, said reference fixture having a preselected first pose with respect to a robot frame of reference, providing a TCP sensor means in a preselected second pose with respect to said reference fixture for sensing position of said tool center point;
   b(i) positioning said tool sensor means so that said reference fixture is in a field of view of said tool sensor means,
   b(ii) calculating a pose of said robot end point with respect to said robot frame of reference,
   b(iii) calculating a pose of said reference fixture with respect to said tool sensor means from a sensed position of said four topographically defined features of said reference fixture,
   b(iv) calculating a position of said tool center point with respect to said reference fixture from a sensed position of said tool center point with respect to said TCP sensor means; and
   c) calculating a position of said tool center point with respect to said tool sensor means and said robot end-point from said first and second poses and said poses calculated in steps b(ii) and b(iii) and the calculated tool center point position in step b(iv).

2. The method according to claim 1 wherein said four spaced topographically defined features of the reference fixture are four edges defined by intersecting surfaces of said reference fixture spatially distinguishable by said tool sensor means, and wherein at least three of said four edges being nonparallel to each other.

3. The method according to claim 2 wherein said four edges are linear edges.

4. The method according to claim 2 wherein said first sensor means is a structured light sensor.

5. The method according to claim 1 wherein said four spaced topographically defined features of the reference fixture are three edges defined by intersecting surfaces of said reference fixture spatially distinguishable by said tool sensor means, including the step of computer generating a virtual edge from an intersection of different planes defining said reference fixture, and wherein at least three of said four edges are nonparallel to each other.

6. The method according to claim 5 wherein said step of generating a virtual edge includes extrapolating said virtual edge from said intersecting planes.

7. The method according to claim 6 wherein said four edges are linear edges.

8. The method according to claim 6 wherein said first sensor means is a structured light sensor.

9. The method according to claim 8 wherein said tool is a welding laser and said second sensor means is a light detection means, and wherein step b(iv) includes determining a focal point of said welding laser by analysing an image of the laser focused on a projection screen.

10. A method for calibration of position of a tool center point of a robot controlled tool with respect to a tool sensor means, the robot controlled tool being attached at an end-point of said robot, and the tool sensor means being affixed to the end-point of the robot and spaced from the robot controlled tool, comprising:
    a) providing at least one reference fixture comprising at least four topographically defined features, providing a second sensor means in a preselected pose with respect to said reference fixture for sensing position of said tool center point;
    b) positioning said tool sensor means in at least three viewing positions with respect to said at least one reference fixture and in each viewing position calculating a pose of said reference fixture with respect to said tool sensor means from sensed positions of said four topographically defined features of said reference fixture;
    c) calculating a position of said tool center point with respect to said reference fixture from a sensed position of said tool center point with respect to said second sensor means; and
    d) calculating a pose of said tool sensor means with respect to said robot end-point by solving two matrix equations given by $$A_1 X = X B_1$$

$$A_2 X = X B_2$$

where X is the pose of said tool sensor means with respect to said robot end-point frame of reference, A is a transformation relating any two viewing positions, and B is a corresponding transformation relating the pose of said reference fixture with respect to said tool sensor means in said any two viewing positions.

11. The method according to claim 10 wherein said at least one reference fixture is three reference fixtures fixed on a support each having a preselected pose with respect to each other, said preselected pose excluding said three reference fixtures being aligned along parallel axes, and wherein each of said three viewing positions is associated with a corresponding reference fixture.

12. The method according to claim 11 wherein said four spaced topographically defined features of the reference fixture are four edges defined by intersecting surfaces of said reference fixture spatially distinguishable by said tool sensor means, and wherein at least three of said four edges being nonparallel to each other.

13. The method according to claim 12 wherein said four spaced topographically defined features of the reference fixture are three edges defined by intersecting surfaces of said reference fixture spatially distinguishable by said tool sensor means, including the step of computer generating a virtual edge from an intersection of different planes defining said reference fixture, and wherein at least three of said four edges non nonparallel to each other.

14. The method according to claim 13 wherein said step of generating a virtual edge includes extrapolating said virtual edge from said intersecting planes.

15. The method according to claim 14 wherein said four edges are linear edges.

16. A system for calibration of position of a tool center point of a robotically controlled tool attached at an end-point of a robot, comprising:
   a) first sensor means comprising means for projecting a beam of electromagnetic radiation and means for detecting a reflected image of said beam, positioning means for moving said first sensor means, the first sensor means being affixed to the end-point of the robot and spaced from the robot controlled tool;
   b) a reference fixture attached to a support member and comprising at least four topographically defined features spatially distinguishable by said first sensor means within a field of view thereof;
   c) second sensor means attached to said support member in a preselected pose with respect to said reference fixture for sensing the position of the tool center; and
   d) processing means connected to said robot and said first and second sensor means for calculating from said reflected image a pose of said reference fixture with respect to said first sensor means and for calculating a position of said tool center point with respect to said first sensor means and said robot end-point.

17. The system according to claim 16 wherein said four topographically defined features of the reference fixture are four edges defined by intersecting surfaces of said reference fixture spatially distinguishable by said tool sensor means, and wherein at least three of said four edges being nonparallel to each other.

18. The system according to claim 17 wherein said four edges are linear edges.

19. The system according to claim 18 wherein said first sensor means is a structured light sensor.

20. The system according to claim 17 wherein said four topographically defined features of the reference fixture are three edges defined by intersecting surfaces of said reference fixture spatially distinguishable by said tool sensor means, wherein said processing means includes means for generating a virtual edge from an intersection of different planes defining said reference fixture, and wherein at least three of said four edges non nonparallel to each other.

21. The system according to claim 20 wherein said step of generating a virtual edge includes extrapolating said virtual edge from said intersecting planes.

22. The system according to claim 21 wherein said four edges are linear edges.

23. The system according to claim 20 wherein said first sensor means is a structured light sensor.

* * * * *